July 11, 1939.  T. R. HOBBS  2,165,753
SELF-CLEANING WATER FOUNTAIN
Filed March 30, 1935
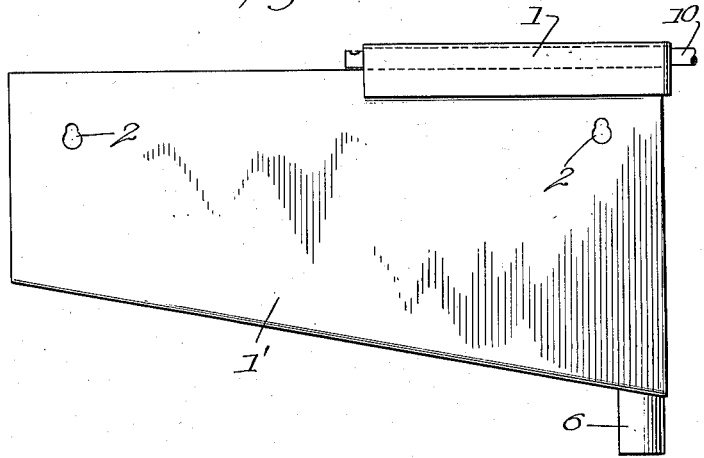
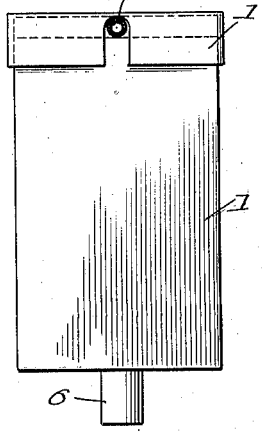
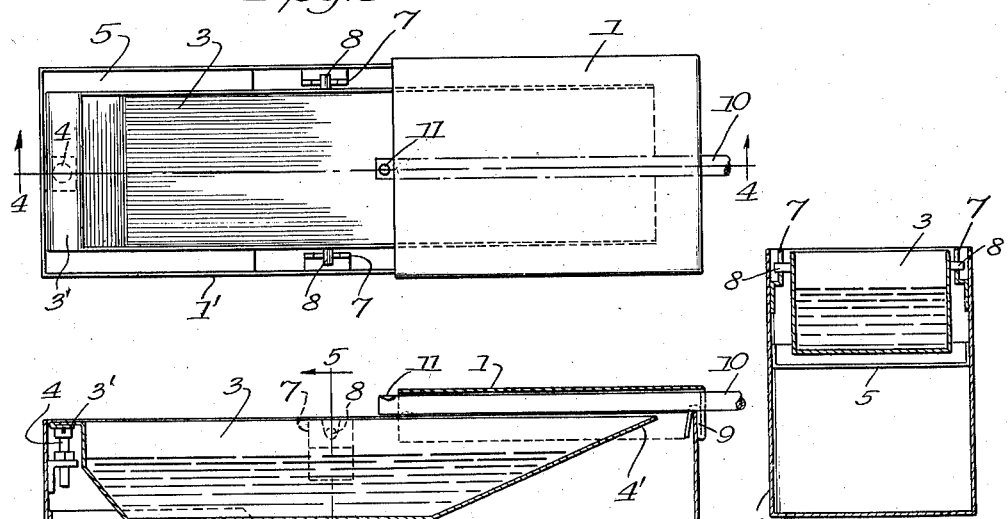
Inventor
Travis R. Hobbs
By F. W. Dahn,
Attorneys Patented July 11, 1939

2,165,753

UNITED STATES PATENT OFFICE 2,165,753

SELF-CLEANING WATER FOUNTAIN

Travis Roe Hobbs, San Dimas, Calif.

Application March 30, 1935, Serial No. 13,954

3 Claims. (Cl. 119—74)

My invention relates to a self-cleaning watering fountain for poultry and stock and it is an object of the same to provide a simple and inexpensive mechanism which shall be economical in its use of water and yet shall furnish an abundance of clean pure water at all times.

Another object of the invention is to provide a fountain which will need no care or attention after being once set up and which has no springs or rubber or any other parts to get out of adjustment or into such condition that the fountain will not operate properly. The construction is such that it is impossible for animals to put it out of order or to cause it to discharge its contents prematurely or to fail to refill itself, and it requires no attention on the part of a care-taker.

Referring to the drawing, which is made a part of this application and in which similar reference characters indicate similar parts:

Fig. 1 is a side elevation of the device of my invention in a form at present preferred, Fig. 2, a rear elevation, Fig. 3, a top plan, Fig. 4, a section on line 4—4 of Fig. 3, and Fig. 5, a section on line 5—5 of Fig. 4.

In the drawing, reference character 1 indicates the cover for the casing 1' of the device, which is provided on one or more sides and/or ends with keyhole shaped openings 2 whereby it may be attached to an appropriate support, as by means of nails or screws having heads projecting from a building, a fence or the like. By appropriate movements of the casing the heads of such nails or screws can each be made to enter the larger part of such a slot after which the casing is lowered so that it will be securely held in place. Reference character 3 indicates a trough having at one end a lip 3' supported by a screw 4 which is adjustable to predetermine the highest possible water level in the trough and so to determine the amount of water which will cause the trough to dump and discharge its contents into the casing. The dimensions of the trough are such that when the level in the trough reaches the top of the inclined portion thereof indicated at 4' the trough will tilt automatically and so discharge all of its contents into the casing, cleaning itself of any dirt at this time. An outlet at 6 conducts the water out of the casing.

Underneath the front end of the trough there is a baffle 5, the purpose of which is to prevent water from rushing to the front end and possibly splashing over this end. Water thus splashing out of the trough might splash over young chicks or ducks and chill them and such action would also be undesirable for other reasons.

The trough is here shown as being provided with pivots 8 near its midlength, the proportions being such, however, as to cause the trough to tilt into dumping position with certainty when the water rises to the top of inclined portion 4', the amount of water in the trough at that time being adjustably predetermined by setting the screw 4 at a desired height. The pivots 8 rest in brackets 7 fixed to the sides of the casing but other methods of mounting the trough in the casing may be used if desired.

The lid 1 covers the rear end of the trough and it is preferably provided with lips 9 extending downward over the walls of the casing so as to hold it securely in place. At its rear end this lid is provided with an opening to receive a pipe 10 extending forward to the tiltable trough and provided at its forward end with a hole 11 in the top of the pipe, from which the water emerges to drip into the trough below it. This hole is located forwardly of the front end of the lid so that birds or other animals may drink from it if they wish instead of drinking from the trough itself.

When the trough is filled to the extent above indicated it will tilt and discharge its contents including any dirt that may be in the trough and will then immediately and automatically return to the normal position shown in Fig. 4, after which it will again be filled at a rate determined by the pipe 10 and preferably also by adjustment of the valve which admits water to said pipe. Thus the trough will continually be filled at a relatively slow rate, will then suddenly discharge its contents and return to normal position and will then again be slowly filled. Obviously it may be placed below the ground level or the floor level for use by very young chicks or it may be attached to a building or a fence or to posts or stakes by the means described and so may be located at any desired height, suited to the use intended to be made of it.

It will be obvious to those skilled in the art that many changes may be made in the device of my invention, all without departing from the spirit of the invention; therefore I do not limit myself to what is shown in the drawing and deslribed in the specification, but only as required by the state of the prior art.

What I claim as new is:

1. In a watering device for poultry and the like, a casing having an outlet at the bottom, a trough freely suspended therein, pivots near the top of the trough, bearings near the top of the casing to receive such pivots, a lid covering the rear end of the casing approximately to said pivots, the bottom of the trough sloping upward approximately from the region of the pivots to the rear end of the trough relatively to the remainder of said bottom and the exposed end of the trough fitting closely in the casing, a supply pipe extending underneath the lid and forwardly thereof and having an outlet at its upper side in front of said lid, a horizontal baffle extending across the casing underneath the exposed end of the trough and rearward nearly to a vertical plane passing through said pivots, a flange extending forward from the front end of the trough, and adjustable means coacting with said flange for varying the amount of water required for dumping the trough.

2. In a device of the character described, a casing, a trough in the casing, means spaced from the midlength of the trough and located close to the top of the casing for supporting the trough tiltably for dumping, the bottom of the trough sloping upward relatively to the rest of the bottom from a point adjacent the axis of the trough to the end most remote therefrom, a lid covering said end approximately to the axis of the trough, and a supply pipe underneath said lid, said pipe having an outlet at its upper side in front of said lid.

3. In a device of the character described, a casing, a trough pivotally supported in the casing, said trough being constructed so as to dump its contents when filled, a lid covering the casing approximately to the axis of the trough, and a supply pipe underneath said lid, said pipe having an outlet at its upper side in front of said lid.

TRAVIS ROE HOBBS.